United States Patent [19]

Brown et al.

[11] Patent Number: 5,452,455

[45] Date of Patent: Sep. 19, 1995

[54] ASYNCHRONOUS COMMAND SUPPORT FOR SHARED CHANNELS FOR A COMPUTER COMPLEX HAVING MULTIPLE OPERATING SYSTEMS

[75] Inventors: Miriam P. Brown, Poughkeepsie; Richard Cwiakala, Wappingers Falls; Kenneth J. Fredericks, Poughkeepsie; Marten J. Halma, Poughquag; David W. Hollar, Saugerties; Roger E. Hough, Highland; Suzanne M. John, Poughkeepsie; Assaf Marron, Poughkeepsie; James C. Mazurowski, Poughkeepsie; Kenneth J. Oakes, Wappingers Falls; Charles E. Shapley, Salt Point; Leslie W. Wyman, Poughkeepsie, all of N.Y.

[73] Assignee: International Business Machines Corporation, Armonk, N.Y.

[21] Appl. No.: 898,977

[22] Filed: Jun. 15, 1992

[51] Int. Cl.[6] ................................................. G06F 9/44
[52] U.S. Cl. ............................ 395/700; 364/DIG. 1; 364/280; 364/280.5
[58] Field of Search ................. 395/650, 700, 275

[56] References Cited

U.S. PATENT DOCUMENTS

| 4,253,145 | 2/1981 | Goldberg | 395/500 |
| 4,564,903 | 1/1986 | Guyette et al. | 364/200 |
| 4,843,541 | 6/1989 | Bean et al. | 364/200 |
| 4,885,681 | 12/1989 | Umeno et al. | 395/375 |
| 4,967,342 | 10/1990 | Lent et al. | 364/200 |
| 5,170,472 | 12/1992 | Cwiakala et al. | 395/275 |
| 5,251,317 | 10/1993 | Iizuka et al. | 395/650 |
| 5,297,262 | 3/1994 | Cox et al. | 395/325 |

Primary Examiner—Kevin A. Kriess
Assistant Examiner—Dennis M. Butler
Attorney, Agent, or Firm—Bernard M. Goldman

[57] ABSTRACT

This invention involves reconfiguration support for shared I/O resources in a a computer electronic complex (CEC) supporting both shared and unshared I/O channels of the type described and claimed in U.S. patent application Ser. No. 07/898,867 (PO9-92-016) filed on the same day as the subject application and assigned to the same assignee as the subject application. Prior channel subsystem call (CHSC) instructions cannot execute when a channel is to be configured as shareable by plural operating systems in a CEC.

20 Claims, 10 Drawing Sheets

CHSC Communication from Program to Channel Subsytem through Hypervisor

*Format of the CHSC Instruction and the Channel-Subsystem Communication Block (CSCB)*

CHSC Communication from Program to Channel Subsytem through Hypervisor

| OC | | OCQ | |
|---|---|---|---|
| IMPLIED IID | | SUBCHANNEL NUMBER | |
| CHPID | CHPT | CHPC | |
| // RECONFIGURATION-ACCESS BIT MASK (256 BITS) // | | | |
| // INITIAL-ACCESS BIT MASK (256 BITS) // | | | |

FIG. 3    *Command-Request Block for Change Channel-Path Configuration Command*

| OC | | OCQ | |
|---|---|---|---|
| IMPLIED IID | | SUBCHANNEL NUMBER | |

FIG. 4    *Command-Request Block for Change Control-Unit Configuration Command*

| OC | | OCQ | |
|---|---|---|---|
| IMPLIED IID | | SUBCHANNEL NUMBER | |
| // CANDIDATE-IMAGES BIT MASK (256 BITS) // | | | |

FIG. 5    *Command-Request Block for Change I/O-Device Configuration Command*

FIG. 6

| OC | | |
|---|---|---|
| KEY | FMT | |
| IMPLIED IID | | SUBCHANNEL NUMBER |

Command-Request Block for Change Configuration Mode Command

FIG. 7

| S | P | | SDC NUMBER | |
|---|---|---|---|---|
| IMPLIED IID | | | PM-1 | PM-2 |
| CHPID0 | CHPID1 | | CHPID2 | CHPID3 |
| CHPID4 | CHPID5 | | CHPID6 | CHPID7 |

Shared-Device-Cluster (SDC) Block in Command-Response Block for Change Control-Unit Configuration and Change I/O-Device Configuration Commands

FIG. 9

CCB (CONFIGURATION CONTROL BLOCK)

| IMAGE ACTIVATE/INACTIVATE | | | | | | | |
|---|---|---|---|---|---|---|---|

IID ⟶ 0  1  2  3 · · · · N

FIG. 10

CHCB (CHANNEL CONTROL BLOCK)

| CHPID | IID | | | |
|---|---|---|---|---|
| U | C | P | A | S |

U = UNSHARED/SHARED INDICATION
C = VARIED ONLINE/OFFLINE INDICATION
P = PERMANENT ERROR INDICATION
A = CANDIDATE INDICATION
S = SUPPRESSED INDICATION
NOTE: IID & CHPID LOCATE CHCB

FIG. 12
SHARED SUBCHANNEL CONTROL BLOCK (SSCB)

| | | | | | | | | | | | |
|---|---|---|---|---|---|---|---|---|---|---|---|
| 0 | INTERRUPTION PARAMETER ||||||||||||
| 1 | 00 | ISC | 000 | E | LM | MM | D | T | V | DEVICE NUMBER |||
| 2 | LPM ||| PNOM ||| LPUM ||| PIM |||
| 3 | MBI ||| POM ||||| PAM |||
| 4 | CHPID-0 ||| CHPID-1 ||| CHPID-2 ||| CHPID-3 |||
| 5 | CHPID-4 ||| CHPID-5 ||| CHPID-6 ||| CHPID-7 |||
| 6 | 00000000 ||| 00000000 ||| 00000000 ||| 00000000 || S |
| | IID ||| CHAIN POINTER |||||| QID |||
| | INCB ||| SSCB NUMBER |||||| DB | ALLEG ||
| | LCUCB # ||| DEVICE ADDRESS (FOR FRAME) ||||||||

NOTE: IID & SSCB NUMBER LOCATE SSCB

FIG. 14
LOGICAL CONTROL UNIT CONTROL BLOCK (LCUCB)

| | | | | | | | |
|---|---|---|---|---|---|---|---|
| V | IID | LOGICAL CU ADDRESS ||| LCUCB NUMBER |||
| | | | | | CU BUSY QUEUE COUNT |||
| TOP OF QUEUE POINTER ||||||||
| BOTTOM OF QUEUE POINTER ||||||||
| SUMMATION OF QUEUE COUNTS ||||||||
| SUMMATION OF ENQUEUES ||||||||
| CHPID-0 || CHPID-1 || CHPID-2 || CHPID-3 ||
| CHPID-4 || CHPID-5 || CHPID-6 || CHPID-7 ||
| B | E | R | S | L | PHYSICAL CHANNEL LINK ADDRESS || PHYSICAL CU LINK ADDRESS |
| SWITCH BUSY COUNT ||||||||
| CONTROL UNIT BUSY COUNT ||||||||
| SUCCESS COUNT ||||||||
| ⋮ ||||||||
| B | E | R | S | L | PHYSICAL CHANNEL LINK ADDRESS || PHYSICAL CU LINK ADDRESS |
| SWITCH BUSY COUNT ||||||||
| CONTROL UNIT BUSY COUNT ||||||||
| SUCCESS COUNT ||||||||

(First block ASSOC WITH CHPID 0; last block ASSOC WITH CHPID 7)

NOTE: IID & LCUCB NUMBER LOCATE THE LCUCB

FIG. 13

|   | 0 | 1 | 2 | ..... | N |
|---|---|---|---|---|---|
| K | LCUCB(K-0) | LCUCB(K-1) | LCUCB(K-2) | ..... | LCUCB(K-N) |
| . | . | . | . |  | . |
| 9 |  |  |  |  |  |
| 8 |  |  |  | ..... |  |
| 7 |  |  |  |  |  |
| 6 |  |  |  |  |  |
| 5 | LCUCB(5-0) | LCUCB(5-1) | LCUCB(5-2) | ..... | LCUCB(5-N) |
| 4 | LCUCB(4-Q) |
| 3 | LCUCB(3-Q) |
| 2 | LCUCB(2-Q) |
| 1 | LCUCB(1-Q) |
| 0 | LCUCB(0-Q) |

(IID) OPERATING SYSTEM NO.

LOGICAL CONTROL UNIT CONTROL BLOCKS (LCUCBS) IN I/O SUBSYSTEM STORAGE

↑ LOGICAL CONTROL UNIT CONTROL BLOCK NUMBER (LCUCB #)

NOTE: Q=IID OF ZERO (HYPERVISOR) OR IID OF OS LCUCB IS ASSIGNED TO

Command-Response Block For Store Configuration Information Command

ASYNCHRONOUS COMMAND SUPPORT FOR SHARED CHANNELS FOR A COMPUTER COMPLEX HAVING MULTIPLE OPERATING SYSTEMS

This invention involves reconfiguration support for shared I/O resources in a a computer electronic complex (CEC) supporting both shared and unshared I/O channels of the type described and claimed in U.S. patent application Ser. No. 07/898,867 (PO9-92-016) filed on the same day as the subject application and assigned to the same assignee as the subject application. The entire content of the following U.S. patent applications, filed on the same day as the subject application, are incorporated by reference into this specification: application serial No. 07/898,867 (PO9-92-016), entitled "Method And Means For Sharing I/O Resources By A Plurality Of Operating Systems" by F. W. Brice, Jr. et al; application Ser. No. 07/898,623, now U.S. Pat. No. 5,265,240. (PO9-92-026), entitled "Channel Measurement Method And Means" by R. E. Galbraith et al; application serial No. 07/898,875 (PO9-92-029), entitled "Pass-Thru For I/O Channel Subsystem Call Instructions For Accessing shared Resources In A Computer System Having A Plurality of Operating Systems" by K. J. Fredericks et al.

Also the following prior-filed applications assigned to the same assignee as the subject application have their entire content incorporated by reference into this specification: application serial No. 07/444,190, filed Nov. 28, 1989, by C. J. Bailey et al, entitled "Method And Apparatus For Dynamically Managing I/O Connectivity" (Docket Number KI989013); Application Serial No. 07/754,813, filed Sep. 4, 1991, by R. Cwiakala et al, entitled "Establishing Synchronization Of Hardware And Software I/O Configuration Definitions" (Docket Number PO991036); Application Serial No. 07/676,603, filed Mar. 28, 1991, by S. M. Benson et al, entitled "Method And Apparatus For Dynamic Changes To System I/O Configuration" (Docket Number PO990026); Application Serial No. 07/755,246, filed Sep. 5, 1991, by J. E. Bostick et al, entitled "Method And Apparatus For Dynamically Changing The Configuration Of A Logically Partitioned Data Processing System" (Docket number PO991028); and Application Serial No. 07/693,997, filed Mar. 28, 1991, by R. Cwiakala et al, entitled "Dynamically Changing A System I/O Configuration Definition" (Docket Number PO991012).

BACKGROUND

The IBM Enterprise Systems Architecture S/390 Principles of Operation (form number SA22-7201-00), and the IBM Enterprise Systems Architecture S/390 Common I/O Device Commands (form number SA22-7204-00) describe the I/O architected structure used in the IBM S/390 systems, such as the IBM S/9000 Central Electronic Complexes (CECs).

The Channel Subsystem Call (CHSC) instruction is an instruction with a single operand which addresses a command request block which contains an operation code field that is capable of containing any of a very large number of operation codes, each of which designates a special command function for the CHSC instruction. These I/O channel subsystem commands perform various types of I/O functions. Some of the prior CHSC instructions operated synchronously. Other prior CHSC instructions operated asynchronously, such as the commands disclosed in application serial No. 07/693,997 (PO9-91-012) previously cited which disclosed and claimed: the "change channel path configuration command", the "change control unit configuration command", and the "change I/O device configuration command". All of these asynchronous CHSC commands have the function of dynamically changing the I/O configuration for a CEC while the CEC is normally operating.

Prior to the invention of the commands disclosed and claimed in application serial No. 07/693,997 (PO9-91-012), a new I/O configuration file was loaded into the CEC's processor controller element, and then the CEC's entire I/O subsystem had to have a power-on reset before it could be made operational with the new configuration.

The invention in application serial No. 07/693,997 (PO9-91-012) disclosed a new way to tailor the I/O subsystem control block structure to represent a particular I/O configuration of channels connectable to CECs, control units connectable to the channels, and I/O devices connectable to the control units. However, that invention did not change the basic control block structure of the I/O subsystem of the CECs. However, the invention in application serial No. 07/898,867 (PO9-92-016) did change the basic control block structure of the I/O subsystem of the CECs by adding the concept of sharing sets of control blocks for each of the I/O resource of channels, control units and devices. The sharing set concept enabled an I/O resource to be shared by a plurality of control programs in a CEC which issued the I/O instructions to the I/O subsystem. These control programs were in different operation systems (OSs) which occupied different logical partitions of the CEC. These partitions are considered logical-resource partitions because they use different parts of the same CEC physical resources, or time share the same resources in the CEC; for example, the main storage is divided by microcode defined boundaries which can easily be changed without changing the physical structure of the main storage.

None of the prior CHSC commands can operate with I/O resources using shared channel paths. The prior CHSC commands can only operate with I/O resources using unshared channel paths. The prior CEC I/O structure required I/O channels that were connected to only a single OS; and the invention in application No. 07/898,867 (PO9-92-016) first enabled a channel to be dynamically switched between the different OSs in a CEC, merely by any OS issuing an instruction requiring the channel—which was then used by the requesting OS if the channel was then available.

Shared I/O resource concept uses the image identifier (IID) invention described and claimed in application serial No. 07/898,867 (PO9-92-016). The IID invention is generally independent of whether or not IIDs, themselves, are hidden from the operating systems (OSs) in the CEC. That application expresses a preference for the IIDs being hidden from the OSs to enable old versions of OSs to operate within a CEC modified with the IID invention to allow shared I/O resources among the OSs. Then, old OS versions may be run in a CEC also running new versions of OSs in its different partitions.

Multiple OSs in a CEC are coordinated by a hypervisor, in which the CPU and storage resources of the CEC are divided among the independently executing OSs. Some hypervisors are structured in internal code (e.g. microcoded hypervisor) and other hypervisors are structured in software (e.g. software hypervisor). A commercial example of a microcoded hypervisor is the IBM S/390 PR/SM (processor resource/system manager), which coordinates resource contentions among independently executing OSs in separate logical resource partitions (LPARs) of a CEC such as the IBM S/9000 model 900. An example of a commercial software hypervisor is the IBM S/370 VM/MPG (virtual machine/multiple preferred guests) system running on an S/370 3090 model J, in which so-called virtual machines (called preferred guests) execute separate OSs in respective logical resource partitions divided by the system software in a software directory.

Prior interpretive execution was obtained in a CEC having multiple independent OSs to increase the CEC's execution efficiency, which is highest when each OS in the CEC is able to have its CPU instructions executed interpretively. Having multiple independent OSs in a CEC requires that the CEC resources be apportioned among the OSs, and that the instructions executed under each OS be restricted to using only the CEC resources assigned to its OS—for example, to execute only within the memory range assigned to the respective OS in the main storage of the CEC.

Configuring a CEC's I/O subsystem involves more than merely considering physically-connected I/O resources, such as a CEC's physical-connected channels, physical-connected control units, and physically-connected devices. Control blocks are provided in the I/O subsystem microcode to electronically control these physical resources. Without these control blocks, the I/O resources alone would be useless to the CEC, because the physical entities alone of these I/O resources cannot be controlled to do work for the CEC.

Accordingly, merely connecting a physical resource to a CEC does not configure that resource into the CEC. This is because the existence of the resource cannot be recognized by the CEC hardware and software until the resource is represented by a control block, which is the entity used by the CEC hardware and software for controlling the physical resource.

In the prior art, a CEC's I/O configuration requires having one control block for each physically-connected I/O resource. The control block contains all of the information needed to control the corresponding I/O physical entity; for example, a busy bit in each control block is provided to indicate whether the physical entity is busy or not, as well as all kinds of other control fields for indicating the current physical characteristics of the entity.

In prior S/370 and S/390 architected computer systems, each channel was configured in the CEC by constructing a single "channel control block" (CHCB) in the CEC's I/O system storage. Each I/O device was configured in the CEC by constructing a single subchannel control block (SCB) in the CEC's I/O subsystem storage. One or more logical control units were configured in the CEC as a shared device cluster by constructing a single logical-control-unit control block (LCUCB). A shared device cluster is defined as a set of one or more logical control units that share devices.

The CHCBs, SCBs and LCUCBs are structured in the I/O subsystem storage, which is not accessible to CEC software, but is accessible to the CEC's hardware and internal code (microcode) to electronically control the corresponding I/O resources physically connected to the CEC.

A control block configured in the system may indicate several states for its physical I/O entity, such as if the entity is usable or not by the CEC's software instructions. For example, the physical resource may be subjected to a "vary off line" command which sets a field in its control block indicating the physical resource is not available for use. Or a "vary on line" command sets the control block field to indicate the physical resource is available for use, although it may be currently busy (indicated by the busy field) and therefore not currently selectable.

Prior art reconfiguration of the CEC's I/O subsystem involves changing these I/O subsystem control blocks. Reconfiguration may add a new control block into the I/O subsystem storage to bring a corresponding I/O resource into the CEC configuration, whether the physical resource was previously-connected or is newly-connected. Or, reconfiguration may delete an existing control block from the I/O subsystem storage to eliminate the corresponding I/O resource from the CEC configuration, even though the resource is still physically connected to the CEC.

In the prior art, the commands to create, modify or delete control blocks in the I/O subsystem are issued by one of the OSs which is executing under the hypervisor's control. Subject to security controls, a properly authorized OS can issue commands that create, modify or delete control blocks which affect resources used by any or all OSs.

Furthermore, two fundamentally different methods are provided in the prior art for obtaining reconfiguration of the CEC's I/O subsystem. They may be generically referred to as static and dynamic reconfiguration methods.

SUMMARY OF RELATED CONCURRENTLY-FILED APPLICATION

The subject invention involves reconfiguration of a CEC's I/O subsystem using the invention described and claimed in U.S. patent application Ser. No. 07/898,867 (PO9-92-016), which enables the sharing of I/O resources using shared channels.

Application serial No. 07/898,867 (PO9-92-016) describes a method for channel sharing to increase the connectivity of the I/O channels in a CEC to a multiplicity of operating systems (OSs) running in different resource partitions of a CEC. OS image identifiers (IIDs) are used for assigning I/O resources to the different OSs. Each OS shared I/O resource is provided with a sharing set of control blocks (CBs) in the I/O subsystem, in which a respective CB is assigned to (and located by) a respective IID of one of the OSs running in the CEC. Each of the CBs in a sharing set provides a different image to each OS of the same I/O resource. The different image CBs are independently controlled and may have different states due to the I/O operations by the different OSs, so that any OS can independently operate the same I/O resource without regard to the manner of use of the resource by other OSs. The IID is used in executing each I/O request by an OS. The IID is even transmitted to the I/O control unit for accessing a requested I/O device and is stored by the control unit as part of a logical path (LP) to the control unit for later use by the control unit in responding back to the requesting OS for that I/O request.

Prior CHSC Commands

A recently introduced type of I/O instruction is the "channel subsystem call" (CHSC) instruction, which can be used to support a large number of commands. None of the previous CHSC commands were interpretively executed.

Some CHSC commands execute synchronously, and other CHSC commands execute asynchronously. Asynchronous CHSC commands include those for dynamically changing the I/O configuration of a CEC, which are described and claimed in prior filed application serial No. 07/693,997 (PO9-91-012) and owned by the same assignee as the subject application. Also, the prior CHSC instructions have software support described and claimed in prior filed application Ser. No. 07/898,867 (PO9-92-026) filed on Jun. 15, 19892 and owned by the same assignee as the subject application.

A CPU executing a synchronous CHSC command for an OS waits for the asynchronous channel subsystem to respond to the command before the CPU can complete its operations for the CHSC command.

A CPU executing an asynchronous CHSC command for an OS releases the CPU as soon as it requests the asynchronous channel subsystem to perform the requested operation. When the I/O subsystem performs its work for the requested command, it responds by sending an interruption signal to the OS so that any CPU next operating for the OS can perform an interruption and indicate to the OS of the response to the CHSC command.

SUMMARY OF THE INVENTION

When the shareable channel feature exists in a CEC, prior CHSC instructions can no longer execute properly, because they cannot handle shareable channels.

It is an object of this invention to enable asynchronously-executable CHSC instructions to execute in a system having channels shared by a plurality of OSs.

It is another object of this invention to enable asynchronously-executable CHSC instructions to execute interpretively in a system having channels shared by a plurality of OSs.

Thus, the invention is concerned with modifications to the execution processes of prior CEC instructions involving asynchronous operations to enable them to execute in CECs having a multiple image facility (MIF), such as described in patent application serial No. 07/898,867 (PO9-92-016). These prior instructions are those instructions disclosed in filed application serial No. 07/693,997 (PO9-91-012) that cannot handle IIDs that discriminate among a plurality of OSs in a CEC.

SUMMARY OF THE INVENTION

The invention involves electronically changing an I/O subsystem in a CEC (computer electronic complex). The configuration of the I/O subsystem is provided therein by means of electronically-detectable control blocks containing all the configuration information in an electronically readable form which enables the physical I/O resources which correspond to these control blocks to be controlled by processes in the I/O subsystem. These I/O subsystem processes for changing the I/O subsystem configuration are controlled asynchronously by CPU instructions, or reconfiguration files, executed electronically in the CEC by electronic processes which use the information provided with these instructions, or reconfiguration files. The content of these instruction is designed by the humans who input the information put into these instructions, or reconfiguration files. Although the detailed description of the preferred embodiment is of a dynamic method and means using instructions to change I/O subsystem configuration, it is understood that static methods of changing the subsystem configuration by means of similar reconfiguration functions are also included in the claims of this specification.

The subject invention provides the electronic capability for changing I/O subsystem configurations that include both shared and unshared I/O resources and and for observing the status of their attributes in a configuration.

The invention may be invoked to make configuration changes immediately by a dynamic process, or later by a static process. In either case, the changes are made asynchronously to its inputting operation. Inputting for dynamically changing a configuration may use the IBM S/390 Channel-Subsystem-Call (CHSC) instruction, which can be executed by an OS program that requests immediate change an I/O system configuration. These CHSC commands include: a "change channel-path configuration" command, a "change control-unit configuration" command, and a "change I/O-device configuration" command. Each of these commands invokes an electronic process in a CEC's I/O subsystem that may add, modify, or delete control blocks supporting a configuration definition containing shared I/O resources, such as: a shared channel definition, a control-unit definition of a control unit attached to a shared channel, and a device definition of a device attached to a control unit which is attached to a shared channel, respectively. The operand-accessed structure has been changed in the CHSC "change configuration mode" command to a format containing data on shared resource parameters. The operand-accessed structure of the CHSC "store configuration information" command has been changed to obtain attributes of shareable resources in a configuration of an I/O subsystem.

BRIEF DESCRIPTION OF THE DRAWINGS

FIG. 3 illustrates the CHSC command-request block for the change channel-path configuration command.

FIG. 4 illustrates the CHSC command-request block for the change control-unit configuration command.

FIG. 5 illustrates the CHSC command-request block for the change I/O-device configuration command.

FIG. 6 illustrates the CHSC command-request block for the change configuration mode command.

FIG. 7 illustrates the shared-device-cluster (SDC) block in the CHSC command-response block for change control-unit configuration and change I/O-device configuration commands.

FIGS. 8 through 14 are the same as corresponding numbered FIGURES in patent application serial No. 07/898,867 (PO9-92-016) and have the same description herein as in that application.

DESCRIPTION OF THE PREFERRED EMBODIMENTS

The preferred embodiment obtains dynamic I/O reconfiguration and has its configuration information inputted to the CEC by means of Channel-Subsystem-Call (CHSC) instructions provided in a program in a selected OS in a CEC. The CHSC instruction has been generally executed by supervisory programs in the operating systems (OSs) of a CEC. Many commands provided under the CHSC instruction have been previously used in CECs built to the IBM S/390 ESA architecture. Novelty is disclosed in this specification in the structuring of certain commands operating under the CHSC instruction, and in processes invoked by these commands.

Novelty also is disclosed herein for processes using static I/O reconfiguration information inputted to a CEC by means of an I/O configuration definition files (IOCDSs) stored in a part of the CEC which can be later put into effect when a power-on reset is applied to the CEC. In IBM S/390 CECs, IOCDF files have been stored on disks in the processor controller elements (PCEs) of such CECs, in which the IOCDF is accessed and put into effect on the next power-on reset after the file is stored in the PCE of a system.

Prior-Art CHSC Instruction

Figure 1:
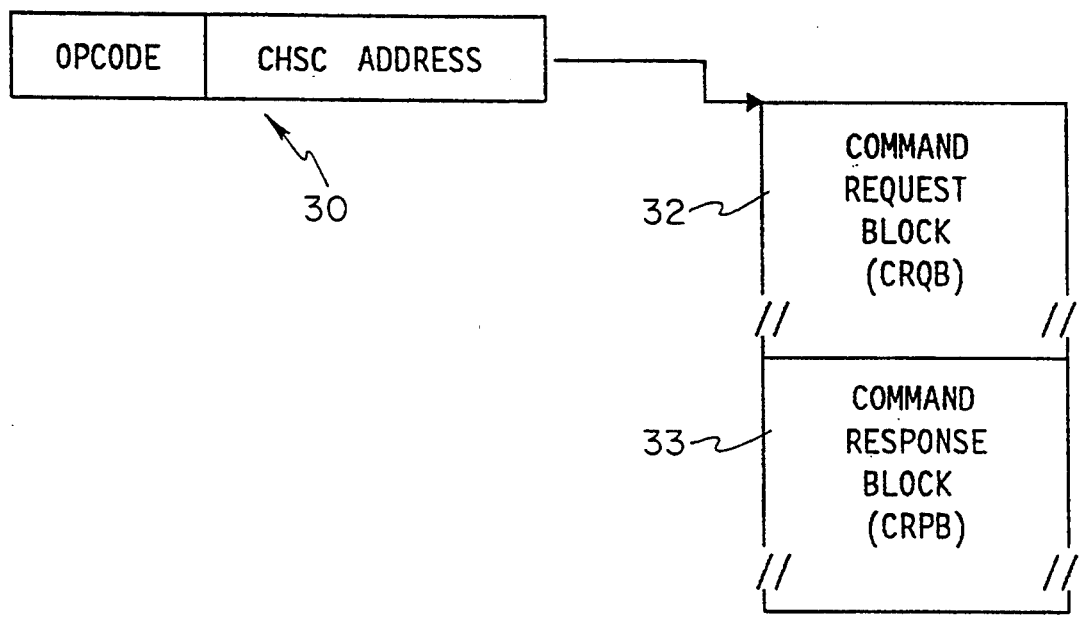
FIG. 1 illustrates the format of the prior-art CHSC instruction.

FIG. 1 shows the prior-art general form of the CHSC instruction 30 used in the prior art, as having an instruction op-code which remains the same for all CHSC commands obtained through the CHSC instruction. The instruction also has a single operand, which locates a command area in the main storage of the CEC containing a pair of control blocks. The operand contains a CHSC address that locates the command area, which contains a command-request block (CRQB) 32 and an associated command-response block (CRPB) 33 which are positioned contiguously in the command area.

Unique Commands Under CHSC Instruction

The CRQB 32 and its content are built by the OS (which is to use the CHSC instruction) in the OS's main storage. CRQB 32 contains a specific operation code that tailors the CHSC instruction 30 to a particular CHSC command. For example, a 10 bit operation code field in CRQB 32 can support up to 1024 different operation codes, which can support that many different CHSC commands. Thus, the general form of the CHSC instruction potentially supports a great many different commands to the I/O subsystem of a CEC, of which only a few CHSC commands have been previously used to control dynamic I/O reconfiguration for unshared I/O channels.

No prior configuration process is known to configure control blocks containing IIDs associated with OSs. Shared I/O resources present special problems to a configuration process.

Thus, the CRQB 32 contains request information in its operation code field (and in other fields) that adapt the CHSC command to unique functions to be performed in the I/O channel subsystem, when that CHSC instruction is executed to send its CRQB 32 to the I/O subsystem. Then, the I/O subsystem attempts to execute the command indicated within the received CRQB 32. Later, the status of that execution is stored by the I/O subsystem into the CRPB 33 (to provide response information on whether execution of that CHSC instruction was successful or unsuccessful).

Prior reconfiguration of I/O subsystems only applied to reconfiguring with unshared channels. That is, prior static IOCDSs and prior dynamic CHSC instructions could only obtain reconfiguration with unshared channels. The invention modifies the configuration process invoked by CHSC instruction 30 so that it can reconfigure an I/O subsystem containing shared channels (unshared channels may also be included) and I/O resources connected to the shared channels (and any unshared channels) are also reconfigured.

Hypervisor Control of IIDs

Figure 2:
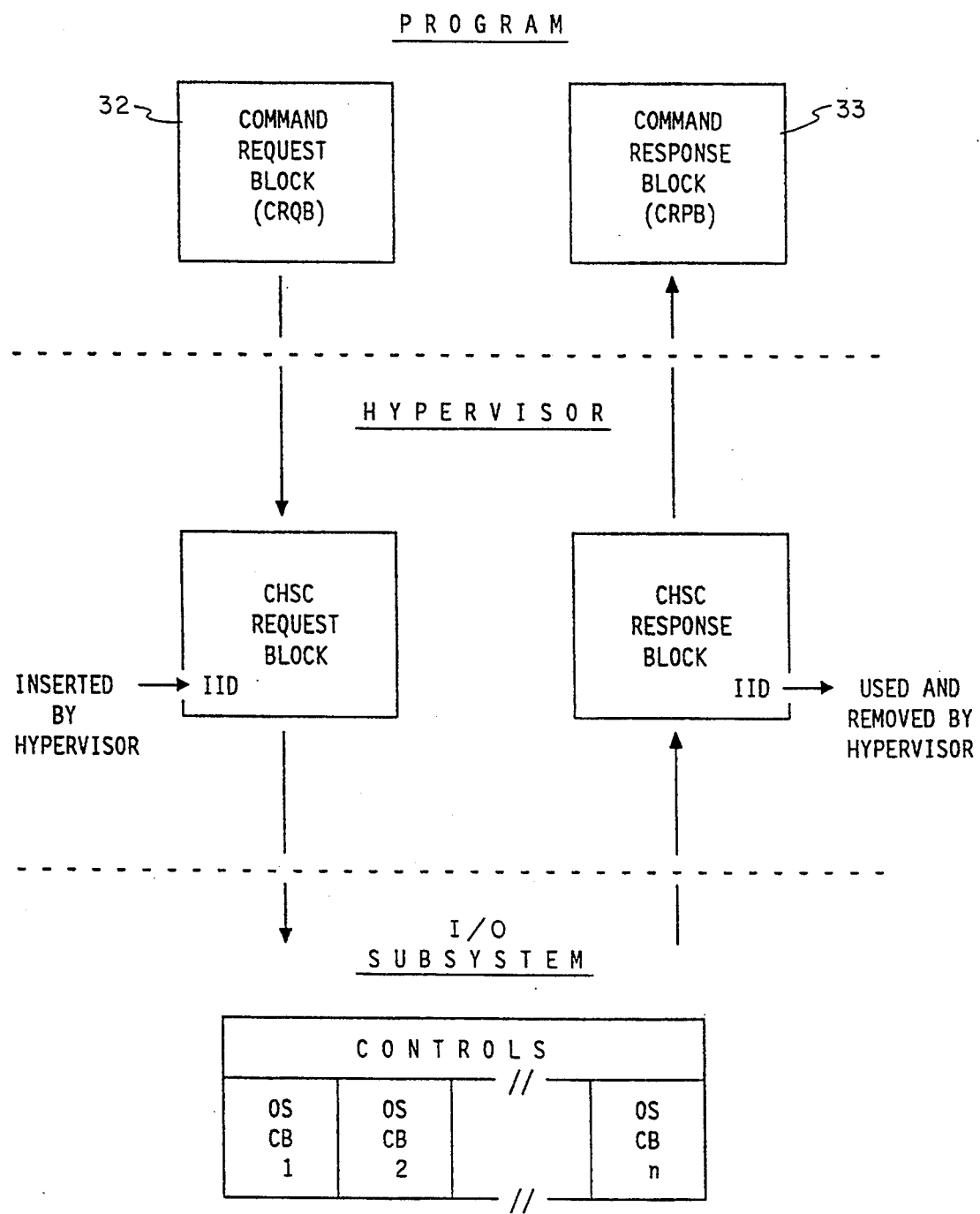
FIG. 2 illustrates an operation for a CHSC command novel to the subject invention, that involves a hypervisor insertion and removal of an OS image identifier (IID) from operating system versions of control blocks addressed by operands in the CHSC instruction.

FIG. 2 shows the novel way each CHSC command is associated with its particular OS by this invention when the command is being passed to the I/O subsystem, and when the I/O subsystem provides a response to the CHSC command.

It should be understood that the I/O subsystem may be simultaneously processing a large number of CHSC commands, and other types of I/O commands, for many different OSs. It is essential that during the simultaneous processing of these many different commands that the I/O subsystem correctly associate each element of its processing with the correct OS for which the processing is being done. To mis-associate an OS with an element of processing would cause a problem in the OS and in the CEC operations.

After the information for a specific CHSC command is processed by the I/O subsystem, the results of that processing must be returned to the correct OS for placement in the correct command-response block (CRPB) 32. There may be many CRPBs simultaneously existing in the MS of each OS, during the execution in the I/O subsystem of commands for many different OSs. It is essential that each I/O subsystem response find its way to the correct CRPB 32 in the correct OS. The hypervisor uses its stored IIDs to find the OS which is to receive the response information. The OS then must find the correct CRPB 32 into which to store the received response information.

The operation of FIGS. 2A and B is preferably done by a microcoded hypervisor, because the code of a microcoded hypervisor can be embedded within the OS instructions to provide an OS/hypervisor interface buried within an instruction's microcode. The processing for the hypervisor then does not involve any software program interruption (interception) the instruction's execution on a CPU includes invoking the hypervisor operation in a manner transparent to the overall execution process for the OS.

On the other hand, a software hypervisor may be used by a CEC instead of a microcoded hypervisor to perform the same type of OS-association handling. But a time penalty is paid in additional CEC operations when using a software hypervisor, due to having an interruption (interception) in the OS operations on the CPU, to enable that CPU to execute the hypervisor software. Each OS interception on a CPU involves saving the CPU status of the OS operations (not done in the microcoded hypervisor operation), so that at the end of the hypervisor processing of the interception it can restore the CPU to its OS state existing when the CPU was intercepted by the hypervisor, so that the CPU can continue its OS processing.

The preferred embodiment uses a microcoded hypervisor, in which the microcode of the hypervisor is embedded in the microcode of the CHSC command being executed in the I/O subsystem. The embedded microcoded hypervisor programming handles all IIDs for associated OSs during the transmission of the information in each CRQB 31 of each CHSC command to the I/O subsystem in the CEC. When the hypervisor microcode processing obtains and stores the IID for the OS (which is sending the respective CRQB information to I/O subsystem), the hypervisor passes control to I/O subsystem microcode, so that the I/O subsystem can then perform the processing required for the particular CHSC command, which involves generating response information for the command and transmitting the response information back to the OS executing that command.

In this way, only the microcoded hypervisor and the I/O subsystem microcode programming need to handle the IIDs, and the IIDs need not be handled by the OSs. Then, no OS is required to know its IID or the IID of any other OS; and then IIDs need only be available to the hypervisor. An important consequence is that a prior OS version (existing before IIDs were used) may run in a CEC using IIDs to support shared I/O resources. And the CEC can support IIDs in either a microcoded hypervisor, or in a software hypervisor to eliminate the OS from having to handle any IIDs or be aware that its requested I/O resources are being shared with other OSs in the CEC.

Thus in FIGS. 2A and B, an OS program that processes a CHSC instruction does not see any IID, the IIDs are considered to be implicitly specified for the OSs. No IID exists in the OS versions of either the CRQB 31 or the CRPB 32 (while they are in the storage of any OS). Accordingly, the IID fields in these OS control blocks are filled with dummy characters, such as all zeros.

To handle the IIDs, the hypervisor copies the CRQB 31 (not having any IIDs) into an area in the I/O subsystem storage and inserts the IID of the requesting OS, so that the IIDs only exist in the hypervisor version of each CRQB 31, which the hypervisor makes available to the I/O subsystem. In this manner, the hypervisor associate the IID of the requesting OS with each CRQB 31.

That information is then processed by the I/O subsystem for the OS in the hypervisor's version of the CRQB 31. During the processing of the command by the I/O subsystem, an association is maintained with the associated hypervisor CRQB 31 to thereby maintain the correct association of the I/O subsystem processing with the correct IID (and OS). This maintains the association of each element of microcode processing for each command.

During the I/O subsystem processing for the command, the I/O subsystem microcode programming builds a CRPB 32 and copies into it the IID from the associated hypervisor CRQB 32.

FIG. 2 represents the hypervisor copying the IID for the correct OS which is to receive particular CRPB 32 to enable identification of the correct OS whenever the I/O subsystem must respond for each of the commands being currently processed by copying the hypervisor and I/O subsystem version of the CRPB 32 into the OS area of storage with all IID fields zeroed to eliminate IID values from the OS version of CRPB 32.

Hence, the IID is not found in the OS's copies of either the CRQB 31 or the CRPB 32, but only in the hypervisor and I/O subsystem versions of these control blocks. As previously explained, this manipulation of the IID may be done by either a microcoded hypervisor or a software hypervisor, so that the IID is not visible to any OS program. (The "OS select IID" field found in the CRQB of patent application serial No. 07/898,867 (PO9-92-026) may be considered not to exist in the CRQBs 31 in the subject specification. It is used only for measurement purposes in that application.)

The IID is used by the I/O subsystem to access and handle a required control block for a shared I/O resource in the manner described in application Ser. No. 07/898,867 (PO9-92-016) as well as in this specification. The I/O subsystem control blocks are located in the I/O subsystem as described in application No. 07/898,867 (PO9-92-016).

Configuration Commands

New CHSC commands are provided which have new qualified operation codes in their CRQBs 31. These new commands establish and change the configurations of the arrays of the I/O resource control blocks shown in FIGS. 8, 11 and 13, which are identical to and have the description provided for corresponding FIGS. 8, 11 and 13 in related patent application serial No. 07/898,867 (PO9-92-016). These FIGURES respectively show channel control blocks (CHCBs), sharing subchannel control blocks (SSCBs) and logical control unit control blocks (LCUCBs). FIGS. 16A and 16B in application No. 07/898,867 (PO9-92-016) shows the combination of all of these different types of control blocks in an I/O subsystem. A shared device cluster is defined as a set of one or more logical control units that share devices. The LCUCB, as shown in FIG. 14, is a representation of a shared device cluster containing only one logical control unit. By replicating the logical control unit address within an LCUCB per CHPID, an LCUCB can represent a shared device cluster with multiple logical control units.

Figure 8:
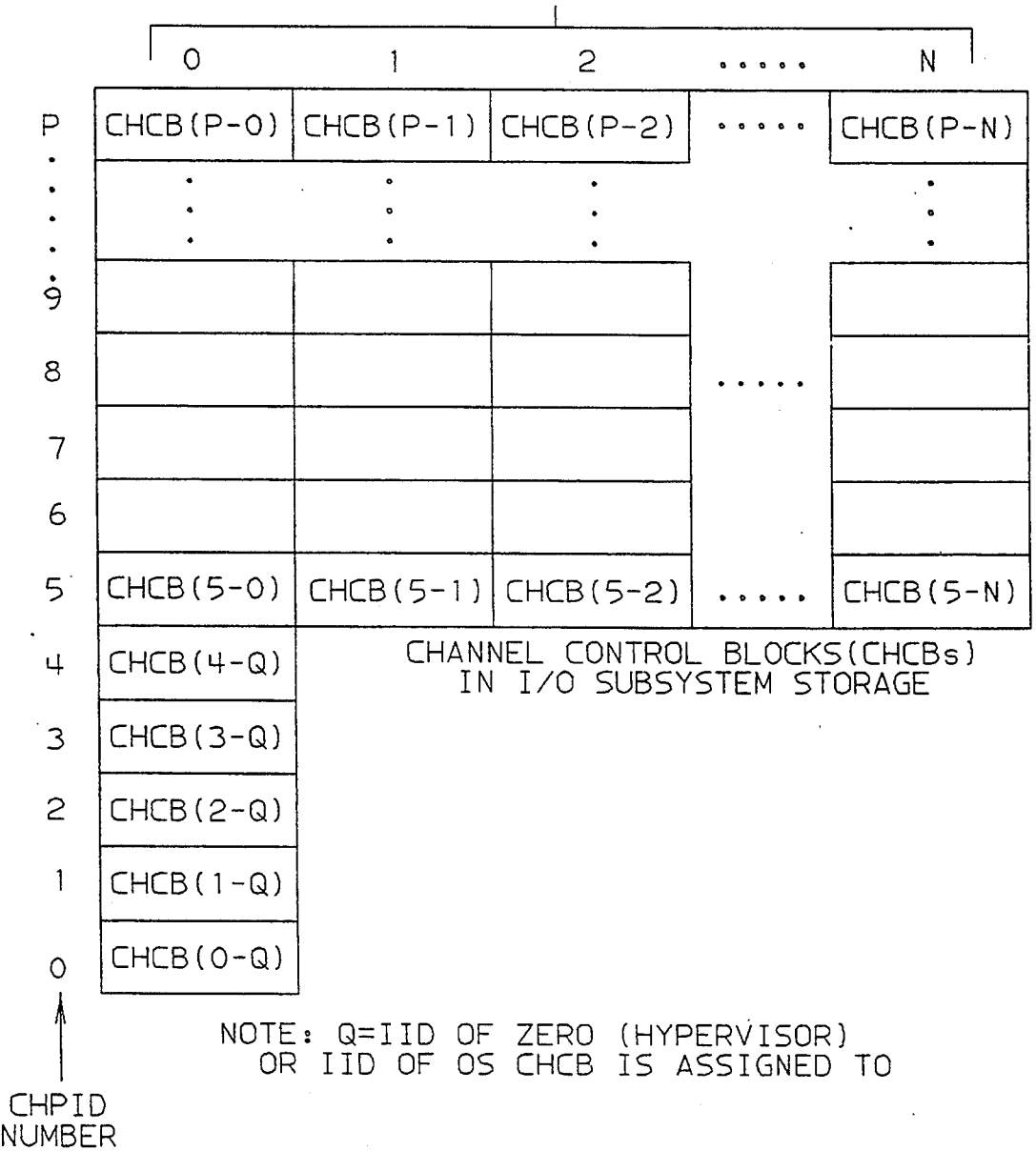
Figure 11:
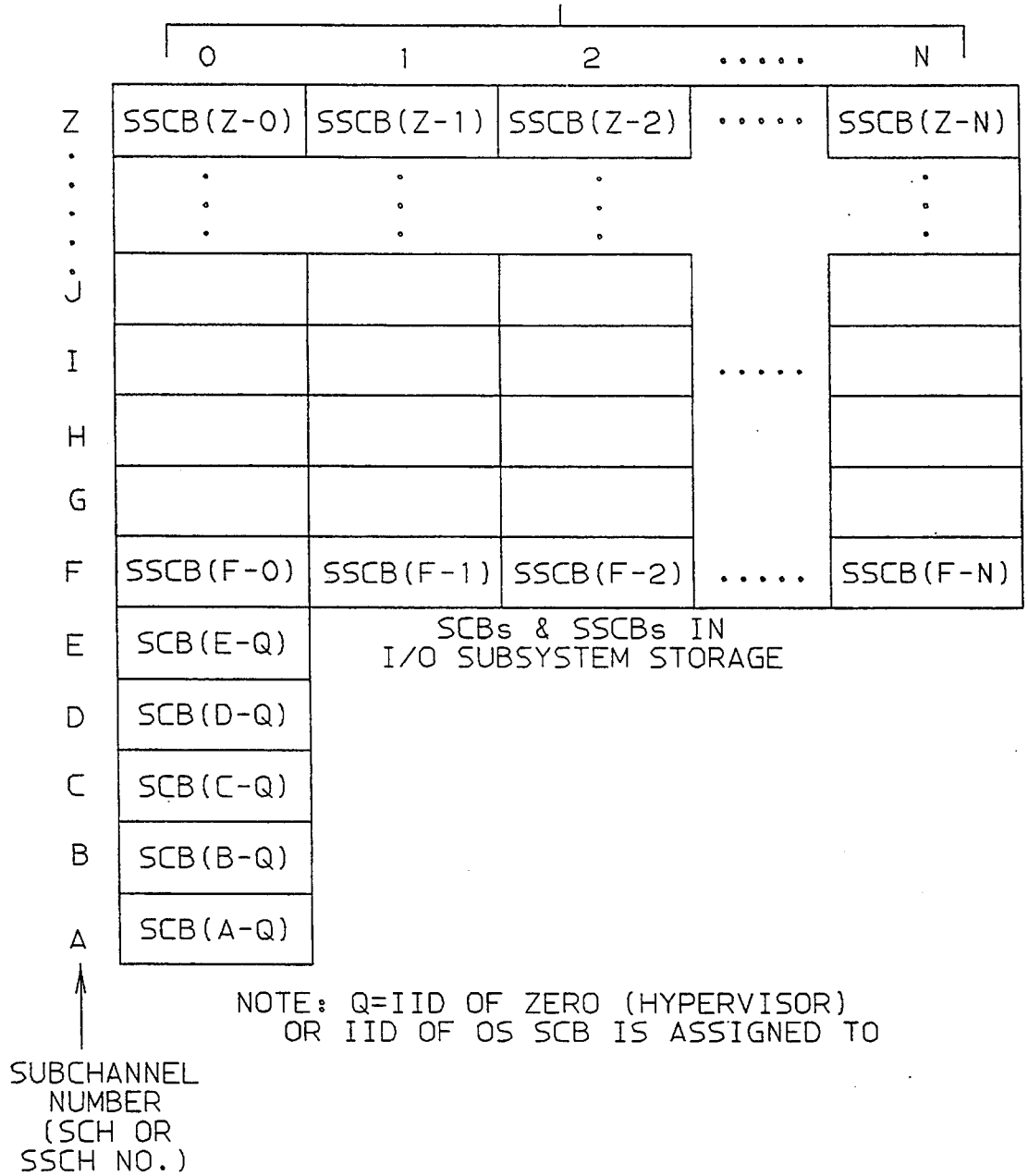

The new command operations described in the preferred embodiments herein change the number and state of control blocks in arrays of the types represented by the control block arrays in FIGS. 8, 11 and 13, which support both shared and unshared resources. These commands can add or delete control blocks to any of these arrays, and modify the states within any existing control block. For example, these commands can add or delete sharing sets of control blocks for shared I/O resources, as well as add or delete control blocks for unshared I/O resources. Another command can vary any control block in a sharing set online or offline to change the number of OSs which are actively sharing an I/O resource.

A particular configuration of control blocks is precisely indicated to a CEC in an I/O resource configuration data set (IOCDS) stored in the I/O subsystem. The IOCDS is usually statically provided when a system is initially generated. Thereafter, the easiest way to change the system I/O configuration is with dynamic commands which allow the CEC to continue operating while the I/O resources are being reconfigured. These dynamic commands allow all I/O resources which are not being affected by the commands to continue being used.

The dynamic reconfiguration commands having new processes provided by the preferred embodiment are:
1. A "change channel-path configuration" command. Its unique command response block is shown in FIG. 3.

2. A "change control-unit configuration" command. Its unique command response block is shown in FIG. 4.
3. A "change I/O-device configuration" command. Its unique command response block is shown in FIG. 5.
4. A "change configuration mode" command establishes a system mode for executing subsequent dynamic-I/O configuration commands. Its unique command response block is shown in FIG. 6.

These commands are performed asynchronously by the I/O subsystem. They are all various types of commands provided under the CHSC instruction. The CPU is immediately released as soon as it completes execution of the CHSC instruction, which occurs when the "command request block" (CRQB) is provided to the I/O subsystem.

Operation Code Qualifiers in The Preferred Embodiment

In the preferred embodiment described herein, the new command operations are represented in the command request blocks (CRQBs) 31 by new values for the operation code qualifier field. The operation code (OC) field in the command has the same value as used in a prior version of the command that could not support shared resources.

Sharing Set Unit in The Preferred Embodiment Commands

The changes to an I/O configuration for shared resources are performed in the preferred embodiment on a resource control unit called a "sharing set", which is described in application serial No. 07/898,867 (PO9-92-016). A sharing set has a separate control block in the set for all IID values provided for the I/O subsystem. Each control block in a sharing set of this preferred embodiment is identical in its field structure to each other control block in the set. That is, each field in each control block of a particular type has identical size fields in identical locations relative to the beginning the control block.

One difference exists in the definition of a sharing set from its definition in co-application serial No. 07/989,867 (PO9-92-016), which is that in this specification a sharing set can have only a single control block, as long as bit U in FIG. 8 is set to its shared state. This permits its sharing set to be reconfigured later to receive additional control blocks which are identical in structure (an image) of the initial control block in the set. If the one block has its bit U set to the unshared state, it is not in a sharing set; and no "image" control blocks can be added.

The term "image" is sometimes used herein to refer to a control block in a sharing set because of its identical structure to other control blocks in the sharing set. However, the states of the "images" in a sharing set are individually set to different states that enable the different OSs to operate differently for the same shared resource.

Accordingly, each "add" command described herein for the preferred embodiment adds one or more sharing sets of control blocks to the IOCD for the I/O subsystem. And, each "delete" command described herein for the preferred embodiment deletes one or more sharing sets of control blocks from the IOCD for the I/O subsystem.

Each "modify" command described herein sets states in one or more control blocks within a sharing set to enable the different OSs in the system (assigned different IIDs) to differently handle the same shared I/O resource separately represented by each control block in the sharing set.

Microcode programs are provided in the I/O subsystem which are invoked by particular commands to perform the function expected of the command. Thus, a microcode program is invoked by an add command to add a sharing set to an identified control block array at a location specified in its command request block 31, such as at a specified location corresponding to the subchannel number in the CRQB 31. Another microcode program is invoked by a delete command to delete a sharing set to an identified control block array at a location specified in its command request block 31. Still another microcode program is invoked by a modify command to modify one or more states in one or more control blocks in a sharing set, as specified in its command request block 31.

Compatibility Constraints in a Command Request Block

Some indicators in a command request block restrict the change operation of the command to a particular type of control block, in order to obtain compatibility with a prior type of I/O resource control block.

Time When Configuration Change Occurs for Mask Indications

The "initial-access bit mask" in a CRQB controls a future I/O configuration of a CEC's I/O subsystem, occurring at the time of the next activation command for each logical partition in the CEC. Only the control block for each OS having a partition activation command is then received into the I/O configuration. Then, the initial access mask may represent some IIDs having their control blocks configured, and other IIDs not having their IIDs configured because no activation command was issued for their partitions. Thus, when a partition receives its next activation, each channel having an outstanding initial access mask bit set to one for each prior command will then become configured for the respective partition. This activates a channel control block for the OS in that partition owning the IID of the mask bit set to one in the mask. In some CECs, any of various types of reset commands may also be used to activate each sharing channel control block having its IID set to a one bit state in the mask of a prior executed "change channel-path configuration" command. Such reset command may, for example, be for any type of reset that reset the I/O subsystem, such as a power-on reset, etc.

On the other hand, the "reconfiguration-access bit mask" in a CRQB changes the I/O configuration of a CEC's I/O subsystem as soon as its command execution is complete. Then, the control block for each OS having a one in its mask bit position is immediately configure as a candidate control block, which can be made active by a subsequent vary-on-line command directed to the resource by its OS.

Access Bit Masks in a Command Request Block

Access bit masks are novel to this invention, since neither they nor their represented concept was used in prior versions of commands having the same names as the new commands for this invention described in this specification.

The number of bits in each access bit mask represents the maximum number of IIDs assigned to the CEC. The location of each bit in the mask represents an IID value in the mask. If the bit is set to a one state, a particular state is set in the control block at that IID location in the sharing set. If the bit is set to a zero state, the state of the block at that IID may of may not be changed, depending on the type of command and the type of mask.

An "initial access bit mask" in a CRQB 31 indicates the IID values which are affected by the mask. The position of each bit in the mask represents a respective IID value in the overall set of IID values available to the system. A one bit in any bit position of the mask indicates the represented IID value is selected. In a system in which the IID values represent the OSs, this mask indicates the OSs which have specified a change in the configuration for the resource.

A "candidate access bit mask" in a CRQB 31 indicates the IID values for control blocks of a subchannel which become candidates. Each bit position in the mask having a one bit represents a respective IID value in the overall set of IID values having a candidate control block specified. In a CEC in which the IID values represent the OSs, this mask indicates the OSs which have candidate control blocks provided for the specified subchannel. Thus, the candidate bit in the mask for each specified shared subchannel for each IID specified as a candidate in the mask is set to a candidate state.

Change Channel-Path Configuration Command

The change channel-path configuration command provides operations that can add, modify, or delete the specified-channel description in the I/O-configuration definition. The inclusion of the implied IID, the enhancement by the modify operation in conjunction with the prior-art add and delete operations, and the new qualified operation codes, provide the mechanism to change a shared channel definition. The add and delete operations are defined in previously cited prior art as the operation code (OC) in the command-request block as shown in FIG. 3. The type of addition or modification is further specified by a qualified operation code, which was defined in the previously cited prior art as the operation-code qualifier (OCQ) in the command-request block as shown in FIG. 3.

The qualified operation codes that changed the ADD operation are described as follows:

Unshared Image-Reconfigurable

The specified channel is added to the I/O-configuration definition as an unshared channel. The channel can be configured to only one OS at a time. The channel can be reconfigured to other OSs for which reconfiguration access has been established. The channel can be configured to any one of the OSs provided in the I/O-configuration definition that are specified in the reconfiguration-access bit masks in the command-request block as shown in FIG. 3. Only one OS can be defined to have initial access to the channel when the OS is subsequently activated. The OS for which initial access is to be established is specified by the initial-access bit mask in the command-request block as shown in FIG. 3.

Unshared Not-Image-Reconfigurable

The specified channel is added to the I/O-configuration definition as an unshared channel. The channel can be configured to only one OS and can be subsequently deconfigured or configured to only that OS. The channel can not be subsequently reconfigured to other provided OSs. The single OS to which the channel can be configured is specified in the reconfiguration-access bit mask in the command-request block as shown in FIG. 3. The same OS may also be given initial access to the channel when the OS is subsequently activated. The initial-access bit mask in the command-request block as shown in FIG. 3 is used to specify the same OS as the reconfiguration-access bit mask when initial access to the channel is to be established.

Shared

The specified channel is added to the I/O-configuration definition as a shared channel, provided that the channel-path type (CHPT) field in the command-request block as shown in FIG. 3 specifies a serial-I/O channel. The channel can be concurrently configured to multiple OSs and used to concurrently execute I/O-operations for all configured OSs. For each sharing image, one channel image is added to the I/O-configuration definition. When the CEC is operating under control of a hypervisor, one channel image can be added to the I/O-configuration definition for each OS specified in the reconfiguration-access bit mask in the command-request block as shown in FIG. 3. The channel is initially configured to each OS specified in the initial-access bit mask in the command-request block as shown in FIG. 3, when these OSs are subsequently activated by the hypervisor.

The qualified operation codes that apply with the new MODIFY operation are described as follows:

Add Access

The I/O-configuration definition of a previously defined channel is modified by adding one or more OSs to the current set of OSs that can be used to access the specified channel. The specified channel and the OS must currently be defined in the I/O-configuration definition. OSs may be added to the set of OSs to which the channel may be subsequently reconfigured. Reconfiguration access may be added for both unshared image-reconfigurable channels and for shared channels. The reconfiguration-access bit mask in the command-request block as shown in FIG. 3 specifies the OSs for which reconfiguration access is to be added. For each OS in the modified set of OSs that has reconfiguration access, the channel may subsequently be configured as follows:

1) Unshared Image-Reconfigurable Channel: The channel can be configured to any one OS in the modified reconfiguration-access set of OSs at a time.
2) Shared Channel: The channel may be concurrently configured to any of the OSs in the modified reconfiguration-access set.

Unconditional Modify Delete Access

The I/O-configuration definition is modified by deleting one or more OSs from the current set of OSs that can be used to access the specified channel. The specified channel and the OS must currently be defined in the I/O-configuration definition. Reconfiguration access may be deleted for both unshared image-reconfigurable channels and for shared channels. The reconfiguration-access bit mask in the command-request block as shown in FIG. 3 specifies the OSs for which reconfiguration access is to be deleted. For each OS deleted from the set of OSs that has reconfiguration access to the channel, the channel is deconfigured from the OS if the OS currently has access to the channel, and the channel may not be subsequently configured to that OS. When the specified channel is a shared channel, the corresponding channel image is deleted; however, the channel definition is not deleted from the current I/O-configuration definition for either shared or unshared channels even when all OSs have been deleted from the set of OSs that have reconfiguration access to the channel. When one or more OSs are deleted from the I/O configuration definition for a shared channel or unshared image-reconfigurable channel by the unconditional modify delete access operation, a notification of this deletion is made to the affected OSs. The method of this notification is the presentation of a channel report word (CRW) to each of the affected OSs.

Conditional Modify Delete Access

The I/O-configuration definition is modified by deleting one or more OSs from the current set of OSs that can be used to access the specified channel only when none of the specified OSs are currently configured to the channel.

When none of the specified OSs are configured to the specified channel, the OS deletes reconfiguration access to the specified channel for the specified OSs just as when Unconditional Modify delete access, as defined above, is specified. When one or more of the specified OSs are configured to the specified channel, reconfiguration access for the specified channel is not modified for any of the specified OSs. An error response code and response-code qualifier are stored in the command-response block indicating that the requested change was not made.

The reconfiguration-access bit mask and the initial-access bit mask as shown in FIG. 3 are described as follows:

Reconfiguration-Access Bit Mask

When the CEC is operating under control of a hypervisor, this bit mask is used to indicate which OSs are to be added or deleted from the set of OSs that have reconfiguration access to the specified channel when either the ADD operation or MODIFY operation is performed as shown in FIG. 9. For each OS that has reconfiguration access to the specified channel, the channel can be configured to the OS by use of the appropriate reconfiguration operations.

When the ADD operation is specified or the modify qualified operation code specifies the add-access operation, a one in a bit position of this mask indicates that the corresponding numbered OS is to be added to the set of OSs that have reconfiguration access to the specified channel. When the corresponding numbered bit is zero, the OS is not to be added to the set of OSs that have reconfiguration access to the specified channel.

When the MODIFY operation is specified and the modify qualified operation code specifies a modify-delete-access operation, a one in a bit position of this mask indicates that the corresponding numbered OS is to be deleted from the set of OSs that have reconfiguration access and the channel is deconfigured from the specified OS if the OS currently has access to the channel and the request is an unconditional-delete-access operation. Additionally, if the corresponding numbered OS is currently in the set of OSs that have initial access to the channel then initial access for the OS is also deleted. When the corresponding numbered bit is zero, the OS is not to be deleted from the set of OSs that have reconfiguration access to the specified channel.

When the ADD operation is specified and the qualified operation code specifies an unshared not-image-reconfigurable channel, only one bit in this mask must be set to one.

When the ADD operation is specified and the qualified operation code specifies either an unshared image-reconfigurable or shared channel, all bits that correspond to provided OSs can be set to one and at least one bit, that corresponds to a provided OS, must be set to one.

When the MODIFY operation is specified, this mask must not contain all zeros.

When the DELETE operation is specified or the CEC is not operating under control of a hypervisor, this bit mask is ignored.

Initial-Access Bit Mask

When the CEC is operating under control of a hypervisor, this bit mask is used to indicate which OSs are to be placed into the set of OSs that have initial access to the specified channel.

When the ADD operation is specified, a one in a bit position of this mask indicates that the corresponding numbered OS is to be added to the set of OSs that have initial access to the specified channel. When the corresponding numbered bit is zero, the OS is not to be added to the set of OSs that have initial access to the specified channel.

When the ADD operation is specified and the qualified operation code specifies an unshared image-reconfigurable or unshared not-image-reconfigurable channel, only one bit in this mask may be one and the corresponding bit in the reconfiguration-access bit mask must also be one.

When the ADD operation is specified and the qualified operation code specifies a shared channel, all bits for all provided OSs may be set to one that also have their corresponding bit in the reconfiguration-access bit mask set to one.

For each OS that has initial-access to the specified channel, the channel is configured to the OS when the OS is subsequently activated as part of the OS activation process executed by the hypervisor.

TABLE 1 illustrates a Summary of Allowed Reconfiguration-access Mask and Initial-access Mask Specifications when the CEC is operating under control of a hypervisor.

When channel access is deleted for an OS, all subchannel images that are associated with the deconfigured channel are also deconfigured from their associated OSs if the deconfigured channel was the last available configured channel associated with the subchannel image. For each deconfigured subchannel image, the subchannel image is no longer available for use by the OS operating in the associated image. Subsequent use of the subchannel image, by the OS, for any subchannel related I/O-instructions that address the subchannel image, results in the same conditions as when the subchannel image is not installed for the OS.

Change Control-Unit Configuration Command

The change control-unit configuration command provides operations that can add, modify, or delete the description of a control unit in the I/O-configuration definition. The inclusion of the implied IID to the add, modify, and delete operations, provides the mechanism to change a control-unit definition of a control unit attached to a shared channel. The add, modify, and delete operations are defined in previously cited prior art as the operation code (OC) in the command-request block as shown in FIG. 4. The type of addition, modification, or deletion may be specified by a qualified operation code, which was defined in the previously cited prior art as the operation-code qualifier (OCQ) in the command-request block as shown in FIG. 4.

When the CEC is operating under control of a hypervisor, all attaching channels from the OS executing the change control-unit configuration command must have the same characteristics. Specifically, they must either be all shared channels or all unshared channels. However, when a control unit is added, or when a channel is added to a previously configured control unit, and the attaching channels are configured as shared, then the set of OSs that share each attaching channel may be different; that is, not all attaching channels have to be shared by the same set of OSs.

Change I/O-Device Configuration Command

The change I/O-device configuration command is enhanced to provide operations that can add, modify, or delete the description in the I/O-configuration definition of one or more I/O devices that are attached to a control unit which is attached to a shared channel. The implied IID is now provided for all three operations. In addition for the add and modify operations, the new qualified operation codes provide the mechanism to selectively define the I/O device to specified OSs. The type of addition, modification, or deletion may be specified by a qualified operation code, which was defined in the previously cited prior art as the operation-code qualifier (OCQ) in the command-request block as shown in FIG. 5.

The change to the ADD operation that is new, is the invention of a candidate-images bit mask in the command-request block as shown in FIG. 5. The candidate-images bit mask specifies the OSs that are to have access to the specified device when the specified I/O-device is attached to shared channels. For each OS specified by the candidate-images bit mask, one subchannel image is added for the specified device that can be used to access the I/O-device. Each added subchannel image for a specified I/O-device is configured with the same subchannel number. This mask is ignored when the specified I/O-device is attached to unshared channels or when the CEC is not operating under control of a hypervisor. For I/O-devices attached to unshared channels, subchannels are added as when the CEC is not operating under control of a hypervisor.

The qualified operation codes for the MODIFY operation that are new to this invention are described as follows:

Add image-access

The I/O-configuration definition is to be modified by adding one or more subchannel-images to the current list of subchannel images that can be used to access the previously defined I/O-device. The candidate-images bit mask in the command-request block as shown in FIG. 5, specifies the OSs for which subchannel images are to be added. For each OS specified by the candidate-images bit mask, one subchannel image is added. Each added subchannel image for a previously defined I/O-device is configured with the same subchannel number. Subchannel images that are added as a result of the modify operation are in the initialized state and are not enabled. When the channels that attach the specified I/O-device are in the configured state for a specified OS, the corresponding bits of the path-installed mask (PIM) and the path-available mask (PAM) for the associated subchannel image are set to ones. When the channels are in the not-configured state, only the appropriate PIM bits are set to ones. This qualified operation code can only be specified when the CEC is operating under control of a hypervisor, the modify operation is specified, and the specified I/O-device is attached to one or more shared channels.

Delete image-access

The I/O-configuration definition is to be modified by deleting one or more subchannel images from the current list of subchannel-images that can be used to access the previously defined I/O-device. The candidate-images bit mask in the command-request block as shown in FIG. 5, specifies the OSs for which the subchannel images are to be deleted. For each OS specified by the candidate-images bit mask, the subchannel image used by that OS to access the previously defined device is deleted. Subchannel images that are deleted as a result of the modify operation have the device-number-valid bit set to zero. However, when access by all provided OSs has been deleted, the specified I/O-device descriptions are not deleted from the I/O-configuration definition. This qualified operation code can only be specified when the CEC is operating under control of a hypervisor, the modify operation is specified, and the specified I/O-device is attached to one or more shared channels.

The candidate-images bit mask as shown in FIG. 5 is described as follows:

Candidate-Images Bit Mask

When the CEC is operating under control of a hypervisor, this mask is used to specify which OSs are to have a subchannel image, that can be used to access the specified I/O-device, either added to the I/O-configuration definition or deleted from the I/O-configuration definition. This mask applies only when the specified device is attached to one or more shared channels.

When the ADD operation is specified, a one in a bit position of this bit mask indicates that the corresponding numbered OS is a candidate for having access to the specified I/O-device. One subchannel image is added for each OS specified in this mask independently of whether the corresponding OS has access to any of the channels to which the device is attached. Each added subchannel image is configured with the same subchannel number and each OS can be used to concurrently access the specified device provided that the OS has access to one or more of the shared channels to which the device is attached.

When the ADD operation is specified, a zero in a bit position of this bit mask indicates that the corresponding numbered OS is not a candidate for having access to the specified I/O-device. No subchannel image is created for the corresponding OS.

When the MODIFY operation is specified and the qualified operation code specifies the add-image-access operation, one subchannel image is added to each OS for which the corresponding bit in this mask is one. When the corresponding bit is zero, no subchannel image is added for the corresponding OS. OSs that currently have a subchannel image for accessing the specified I/O-device are not specified in the mask.

When the MODIFY operation is specified and the qualified operation code specifies the delete-imageaccess operation, a one in a bit position of this mask indicates that the corresponding numbered OS is to have access deleted from the specified I/O-device. The subchannel image configured to each specified OS is deleted from the I/O-configuration definition. When the corresponding bit is zero, the subchannel image is not deleted from the corresponding OS. OSs that currently have no subchannel image for accessing the specified I/O-device are not specified in the mask.

When the ADD operation is specified, at least one bit for a provided OS must be one in this mask.

When the MODIFY operation is specified and the qualified operation code specifies the add-image-access operation, at least one bit for a provided OS must be one in this mask and any specified OSs must not currently be in the set of OSs that have access to the specified device.

When the MODIFY operation is specified and the qualified operation code specifies the delete-image-access operation, at least one bit must be one in this mask and all specified OSs must currently be in the set of OSs that have access to the specified device.

This mask is ignored when the specified device is attached to unshared channels, the DELETE operation is specified, or the CEC is not operating under control of a hypervisor.

When the CEC is operating under control of a hypervisor, all OSs that are provided by the current I/O-configuration definition are candidates for accessing the specified I/O-devices when the devices are configured to shared channels. In this case, one subchannel image, each with the same subchannel number, is created for each provided OS.

TABLE 2 illustrates a Summary of Allowed Candidate-images Bit Mask Specifications.

Change Configuration Mode Command

The change configuration mode command provides the initiation or termination of configuration modes, which is necessary for the successful execution of the CHSC commands that change I/O-configuration definitions, as described above. The inclusion of the implied IID and the definition of a format specification provides a mechanism to establish the configuration mode for subsequent dynamic-I/O configuration commands. The format specification (FMT) is defined in the command-request block as shown in FIG. 6 and is described as follows:

Format (Fmt)

The field contains a binary value that specifies the format of the command-request block and the command-response block that the OS will use for subsequent dynamic-I/O configuration commands. The specified value is compared with the installed value at the channel subsystem. When the values are not equal, the channel subsystem cannot accept command-request blocks for the dynamic-I/O configuration commands that have the specified format, and the channel subsystem does not enter configuration mode. When the channel subsystem is already in configuration mode and this command is executed, this value is ignored.

The channel subsystem uses this value to determine the expected format of the command-request block and the command-response block for the change channel-path configuration, change control-unit configuration, change I/O-device configuration, and store configuration information CHSC commands.

Format 0

The OS will use format 0 command-request blocks and expects format 0 command-response blocks. The channel subsystem accepts format 0 command-request blocks and stores format 0 command-response blocks when the dynamic-I/O configuration facility is installed and the multiple-image facility is not installed.

Format 1

The OS will use format 1 command-request blocks and expects format 1 command-response blocks. The channel subsystem accepts format 1 command-request blocks and stores format 1 command-response blocks when the dynamic-I/O configuration facility is installed and the multiple-image facility is installed.

The OS should specify the value of the command-request block format that it uses and is expecting the channel subsystem to process in the format field in the command-request block of the change configuration command. This is desired in order to preclude the possibility of the channel subsystem from incorrectly processing the contents of the command request blocks associated with the change channel-path configuration, change control-unit configuration, change I/O-device configuration, and store configuration information commands when the OS is in configuration mode.

Change Control-Unit Configuration and Change I/O-Device Configuration Command-Response Block The implied IID in the appropriate shared-device-cluster (SDC) block of the command-response block, identifies to the hypervisor the OS for which the specified shared-device-cluster block is recognized from the attempt to execute the change control-unit configuration and change I/O-device configuration commands. The shared-device-cluster block as shown in FIG. 7 contains a subset of information in a shared device cluster.

The implied IID and the subchannel number in the appropriate subchannel block of the command-response block, identifies to the hypervisor the OS with which the specified subchannel image is associated from the attempt to execute the change control-unit configuration and change I/O-device configuration commands.

The IIDs contained in the shared-device-cluster blocks and the subchannel blocks in the command-response block are used and removed by the hypervisor before storing the command-response block to OS main storage.

Store Configuration Information Command

Figure 15:
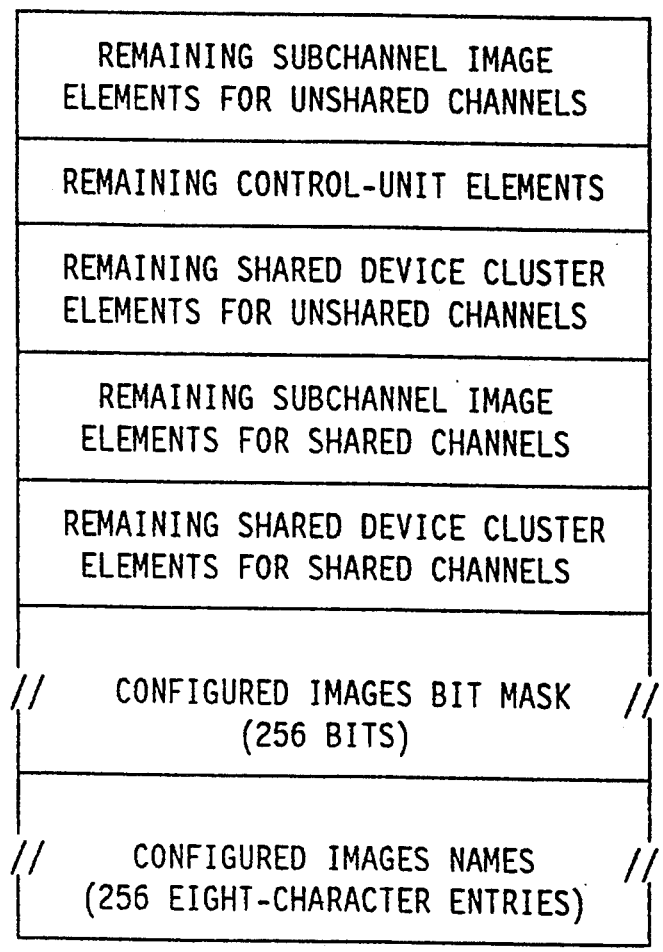
FIG. 15 illustrates the CHSC command-response block for the store configuration information command.

The store configuration information command is enhanced to provide multiple-image-facility related information in appropriate fields of the command-response block as shown in FIG. 15 and described as follows:

Remaining Subchannel-Image Elements for Unshared Channels

A 32-bit unsigned binary integer that specifies the number of remaining subchannel-image elements that are available for devices configured to unshared channels.

Remaining Control-Unit Elements

A 32-bit unsigned binary integer that specifies the number of remaining control-unit elements that are available for devices configured to unshared channels.

Remaining Shared-Device-Cluster Elements for Unshared Channels

A 32-bit unsigned binary integer that specifies the number of remaining shared-device-cluster elements that are available for devices configured to unshared channels.

Remaining Subchannel-Image Elements for Shared Channels

A 32-bit unsigned binary integer that specifies the number of remaining subchannel-image elements that are available for devices configured to shared channels.

Remaining Shared-Device-Cluster Elements for Shared Channels

A 32-bit unsigned binary integer that specifies the number of remaining shared-device-cluster elements that are available for devices configured to shared channels.

When the CEC is operating under control of a hypervisor:

1) The number of subchannel-image elements that are required to support each device that is configured to unshared channels is equal to the number of attaching unshared-reconfigurable channels plus the number of unique OSs associated with any attaching unshared-non-reconfigurable channels.
2) The number of shared-device-cluster elements that are required to support each shared device cluster associated with unshared channels is equal to the number of attaching unshared-reconfigurable channels plus the number of unique OSs associated with any attaching unshared-non-reconfigurable channels.
3) One subchannel-image element is required to support each device that is configured to shared channels. Each subchannel-image element for shared channels contains enough space for 1 subchannel-image for each OS provided in the I/O-configuration definition. Therefore, the remaining subchannel-image elements for shared channels specifies the number of devices that can be added to the I/O-configuration definition for shared channels.
4) One shared-device-cluster element is required to support each shared device cluster associated with shared channels. Therefore, the remaining shared-device-cluster elements for shared device clusters associated with shared channels specifies the number of shared device clusters that can be added to the I/O-configuration definition for shared channels.
5) One control-unit element is required for each control-unit added to the I/O-configuration definition. Therefore, the remaining control-unit-elements field specifies the number of control units that can be added to the I/O-configuration definition.

Configured-Images Bit Mask

This field contains the configured-images bit mask that specifies which OSs are configured. A one in a bit position of this mask indicates that the corresponding numbered OS is configured. A zero in a bit position of this mask indicates that the corresponding numbered OS is not provided in the configuration. When the CEC is operating under control of a hypervisor, this mask also specifies which of the eight-byte entries in the configured-images names field contain an OS name.

Configured-Images Names

This field contains a 256 eight-character (EBCDIC) entry. Each eight-character entry corresponds to the same numbered OS. When the corresponding numbered bit in the configured-images bit mask is one, the entry contains the OS name.

When the corresponding numbered bit in the configured-images bit mask is zero, or when the CEC is not operating under control of a hypervisor, the entry contains a binary value of zero.

TABLE 1 provides a summary of specifications for allowed reconfiguration-access masks and initial-access masks, as follows:

TABLE 1

| Summary of Allowed Access-Mask Specifications and Results | OC=ADD | OC=MODIFY OCQ=add-acc | OC=MODIFY OCQ=del-acc |
|---|---|---|---|
| Channel Path Type | A B C | A B C | A B C |
| Access-mask Specs: | /////// | /////// | /////// |
| Both masks are all 0s. | N N N | — — — | — — — |
| Reconfig.-access mask ignored. | N N N | Y N N | Y N N |
| 1 bits in reconfig.-access mask must correspond to provided image. | Y Y Y | — Y Y | — Y Y |
| Reconfig.-access mask all 0s. | N N N | — N N | — N N |
| >1 bit=1 in reconfig.-access mask | N Y Y | — Y Y | — Y Y |
| Initial-access mask ignored. | N N N | Y Y Y | Y Y Y |
| 1 bits in initial-access mask must correspond to provided image. | Y Y Y | — — — | — — — |
| Initial-access mask all 0s. | Y Y Y | — — — | — — — |
| >1 bit=1 in initial-access mask. | N N Y | — — — | — — — |
| Initial-access mask bit=1 & same reconfig.-access mask bit=0. | N N N | — — — | — — — |

TABLE 1-continued

| Summary of Allowed Access-Mask Specifications and Results | OC=ADD | OC=MODIFY OCQ=add-acc | OC=MODIFY OCQ=del-acc |
|---|---|---|---|
| Initial-access mask bit=0 & same reconfig.-access mask bit=1. | Y Y Y | — — — | — — — |
| Initial-access mask bit=1 & same reconfig.-access mask bit=1. | Y Y Y | — — — | — — — |
| Access-set and Access-mask: | /////// | /////// | /////// |
| Bits in reconfig.-access mask must be 0 in the same set. | — — — | — Y Y | — N N |
| 1 Bits in reconfig.-access mask must be 1 in the same set. | — — — | — N N | — Y Y |
| Results of Modify operation: | /////// | /////// | /////// |
| Add-access results in: >1 Image in reconfig.set. | — — — | — Y Y | — — — |
| Delete-access results in: | | | |
| Empty reconfiguration-access set. | — — — | — — — | — Y Y |
| Empty initial-access set | — — — | — — — | — Y Y |

Legend:
A = Unshared not-image-reconfigurable channel.
B = Unshared image-reconfigurable channel.
C = Shared channel.
— = Not Applicable
Y = Yes or allowed.
N = No or not allowed.

TABLE 2

| Candidate-images mask applies to shared channels only and only for ADD or MODIFY operations. | ADD | MODIFY a d d | MODIFY d e 1 |
|---|---|---|---|
| Mask All 0s. | N | N | N |
| 1 bits in mask must correspond to provided images. | Y | Y | Y |
| More than 1 bit = 1 in mask | Y | Y | Y |
| 1 bits in mask must be 0 in set | — | Y | N |
| 1 bits in mask must be 1 in set | — | N | Y |
| Modify results in empty set. | — | N | Y |

Y = Allowed.
N = Not Allowed.

Static Configuration of CEC with Shared I/O Resources

The process of configuring shared channels and associated I/O resources such as attaching control units and their respective I/O devices can also be provided by use of non-dynamic means for changing the I/O configuration definition used by a CEC in order to access and control the shared I/O.

The definition of shared I/O resources can be processed by an I/O configuration program, the output of which is saved and loaded into the CEC for subsequent use by the CEC when a power-on-reset (POR) or initial machine load (IML) function is subsequently performed by the CEC. The saved I/O configuration is loaded into a Hardware Systems Area (HSA) of the CEC by the CECs service processor as part of a subsequent POR (power-on reset) or IML function and is used by the channel subsystem microcode to initialize the shared subchannel, control unit, and channel path control blocks (as described in the 016 docket) to a predetermined state that will be used by the channel subsystem when the shared I/O resources are accessed.

As part of the POR or IML function, the hardware hypervisor microcode may also be loaded and and initialized. Subsequent to the completion of the POR or IML, the hardware hypervisor may activate the logical-resource partitions for the purpose of executing plural OSs that will access the shared I/O resources.

Alternatively, a hardware hypervisor is not loaded as part of the POR or IML process, but a software hypervisor is loaded. For such PORs and IMLs, the CEC may be Initial Program Loaded (IPLed) with the hypervisor subsequent to the POR or IML in order to cause the execution of a software hypervisor that will in turn subsequently load and execute plural OSs that will access the shared I/O resources.

This POR or IML process of activating the I/O resources in the CEC is NOT dynamic in the sense that it can not be done concurrently with the operation of any of the OSs that would want to access the shared I/O resources. In contrast, the previously described CHSC method IS DYNAMIC in that the change of shared and non-shared I/O resources in the I/O configuration definition can be done concurrently with the operation of the plural OSs in the CEC.

Many variations and modifications are shown which do not depart from the scope and spirit of the invention and will now become apparent to those of skill in the art. Thus, it should be understood that the above described embodiments have been provided by way of example rather than as a limitation.

Having thus described our invention, what we claim as new and desire to secure by Letters Patent is:

1. A method of reconfiguring an input/output subsystem shared by a plurality of control programs (OSs) in a computer electronic complex (CEC), each of said programs having a program identifier (IID), said method including the steps of:
   providing a sharing set of input/output control blocks, each input/output control block of said sharing set including an input/output resource identifier for an input/output resource and a program identifier;

storing said sharing set of input/output control blocks in said computer electronic complex;

providing a configuration mask for establishing a reconfiguration of said input/output resource, said configuration mask including an image identifier field for identifying each of said plurality of programs;

setting said image identifier field to a state that specifies an image identifier of a program;

accessing said sharing set of input/output control blocks;

setting a field in said sharing set of control blocks that corresponds to said image identifier field that has been set in the previous setting step;

changing association of input/output resources in accordance with said configuration mask in each of said control blocks of said sharing set of input/output control blocks that have a field in the just previous setting step.

2. A method of reconfiguring as I/O subsystem of a computer electronic complex (CEC), as defined in claim 1, including the further step of:

changing a field in the control block of the sharing set to dis-associate the IID of the one field indicated in the configuration mask for the control block of the sharing set to reconfigure the input/output resource from the control program represented by the IID.

3. A method of reconfiguring an I/O subsystem of a computer electronic complex (CEC), as defined in claim 2, including the further step of aborting the dis-associate operation in the step of claim 2 if the OS associated with the IID has the input/output resource currently in use.

4. A method of reconfiguring an I/O subsystem of a computer electronic complex (CEC), as defined in claim 1, further comprising the step of:

providing an I/O channel identifier of a physical channel to represent the I/O resource.

5. A method of reconfiguring an I/O subsystem of a computer electronic complex (CEC), as defined in claim 1, further comprising the step of:

providing an I/O device identifier of a physical device to represent the I/O resource.

6. A method of reconfiguring an I/O subsystem of a computer electronic complex (CEC), as defined in claim 2, further comprising the step of:

providing an I/O channel identifier of a physical channel to represent the I/O resource.

7. A method of reconfiguring an I/O subsystem of a computer electronic complex (CEC), as defined in claim 2, further comprising the step of:

providing an I/O device identifier of a physical device to represent the I/O resource.

8. A method of reconfiguring an I/O subsystem of a computer electronic complex (CEC) for sharably controlling an I/O resource, as defined in claim 1, further comprising the steps of:

partitioning CEC resources into a plurality of partitions in which any partition can contain an operating system, in which the different partitions are assigned different IID values associated with the OSs in the partitions; and including all of the IIDs for the partitions containing operating systems in the set of IIDs.

9. A method of reconfiguring an I/O subsystem of a computer electronic complex (CEC) for sharably controlling an I/O resource as defined in claim 1, further comprising the steps of:

structuring the mask to contain a field for each IID currently represented in the CEC, and locating each field in the mask with one of the IID values associated with the field; and setting at least one of the mask fields to a state that controls one or more settings in a control block assigned the IID associated with the field.

10. A method of reconfiguring an I/O subsystem of a computer electronic complex (CEC) for sharably controlling an I/O resource as defined in claim 1, the structuring step further comprising the step of:

structuring a single bit in the mask to represent each field associated with a respective IID.

11. A method of reconfiguring an I/O subsystem of a computer electronic complex (CEC) for sharably controlling an I/O resource as defined in claim 1, including the step of:

executing a configuration-change command to add sharing controls to an I/O configuration of the CEC for a shareable I/O resource as specified in a mask of a command request block (CRQB) of the command.

12. A method of reconfiguring an I/O subsystem of a computer electronic complex (CEC) for adding shareable an I/O resource as defined in claim 11, the executing step further comprising the step of:

making a sharing set of control blocks usable as the sharing controls for a shareable I/O resource specified in the CRQB.

13. A method of reconfiguring an I/O subsystem of a computer electronic complex (CEC) for adding shareable an I/O resource as defined in claim 12, the making step further comprising the steps of:

activating a spare field in each control block in a spare sharing set of control blocks (previously copied into the I/O subsystem in a disabled state); and setting a candidate state in each control block of the sharing set as indicated by the command in order to configure the spare sharing set of control blocks into the I/O subsystem of the CEC.

14. A method of reconfiguring an I/O subsystem of a computer electronic complex (CEC) for sharably controlling an I/O resource as defined in claim 1, including the steps of:

executing a configuration-change command to add-modify existing sharing controls for a shareable I/O resource as specified in a mask of a command request block (CRQB) of the command; and setting a candidate state in each control block of the sharing set as indicated by the command in order to provide a candidate state for any control block not previously set to a candidate state in a sharing set of an I/O configuration for a CEC.

15. A method of reconfiguring an I/O subsystem of a computer electronic complex (CEC) for sharably controlling an I/O resource as defined in claim 14, the executing step further comprising the step of:

executing by a program associated with a particular IID of a vary-on command specifying a shared resource having a candidate state to activate the shared control for the program to allow the program to use the resource without any intervening power-on reset of the CEC or the I/O subsystem.

16. A method of reconfiguring an I/O subsystem of a computer electronic complex (CEC) for add-modifying shareable an I/O resource as defined in claim 14, further comprising the steps of:

structuring a candidate access mask (CAM) provided with the add-modifying command to have a corresponding field for each IID currently represented in the CEC, each mask field being set to indicate a candidate or non-candidate state predetermined for corresponding control blocks in the sharing set; and setting a candidate field in each control block of the sharing set to the state of a mask field located by the IID of the program associated with the respective control block in the sharing set.

17. A method of reconfiguring an I/O subsystem of a computer electronic complex (CEC) for sharably controlling an I/O resource as defined in claim 1, including the steps of:

executing a configuration-change command to delete-modify existing sharing controls for a shareable I/O resource as specified in a mask of a command request block (CRQB) of the command; and setting a candidate state in each control block of the sharing set as indicated by the command in order to remove from candidate state any control block previously set to a candidate state or to an active state in a sharing set of an I/O configuration for a CEC.

18. A method of reconfiguring an I/O subsystem of a computer electronic complex (CEC) for delete-modifying a shareable I/O resource as defined in claim 17, the executing step further comprising the steps of:

structuring a non-candidate access mask (CAM) provided with the delete-modifying command to have a corresponding field for each IID currently represented in the CEC, each mask field being set to indicate a candidate or non-candidate state predetermined for corresponding control blocks in the sharing set; and setting a candidate field in each control block of the sharing set to the state of a mask field located by the IID of the program associated with the respective control block in the sharing set to enable a control block previously in active or candidate state to be removed from the I/O configuration.

19. A method of reconfiguring an I/O subsystem of a computer electronic complex (CEC) for sharably controlling an I/O resource as defined in claim 1, further comprising the steps of:

specifying the I/O resource as a shared channel in a command having a special operation code and a channel identifier and a mask field for each control block in a sharing set for indicating the configuration states of the control blocks.

20. A method of reconfiguring an I/O subsystem of a computer electronic complex (CEC) for sharably controlling an I/O resource as defined in claim 1, further comprising the steps of:

specifying the I/O resource as a shared device in a command having a special operation code and a subchannel identifier and a mask field for each control block in a sharing set for indicating the configuration states of the control blocks.

* * * * *